US007357715B2

(12) United States Patent
Kane

(10) Patent No.: US 7,357,715 B2
(45) Date of Patent: Apr. 15, 2008

(54) SYSTEM AND METHOD FOR PLAYING A ROLE-PLAYING GAME

(75) Inventor: Steven N. Kane, Boston, MA (US)

(73) Assignee: Gamelogic, Inc., Cambridge, MA (US)

( * ) Notice: Subject to any disclaimer, the term of this patent is extended or adjusted under 35 U.S.C. 154(b) by 72 days.

(21) Appl. No.: 10/910,564

(22) Filed: Aug. 3, 2004

(65) Prior Publication Data

US 2006/0027965 A1 Feb. 9, 2006

(51) Int. Cl.
*A63F 1/00* (2006.01)
*A63F 3/06* (2006.01)
*A63F 13/00* (2006.01)

(52) U.S. Cl. ............................ 463/18; 463/17; 463/42; 273/138.2; 273/138.1; 273/292

(58) Field of Classification Search ................ 273/292, 273/269, 138.1, 138.2, 139, 143 R, 274; 463/18, 17, 19, 20, 42, 13, 12
See application file for complete search history.

(56) References Cited

U.S. PATENT DOCUMENTS

| | | | |
|---|---|---|---|
| 4,494,197 | A | 1/1985 | Troy et al. |
| 4,582,324 | A | 4/1986 | Koza et al. |
| 4,679,789 | A | 7/1987 | Okada |
| 4,689,742 | A | 8/1987 | Troy et al. |
| 4,725,079 | A | 2/1988 | Koza et al. |
| 4,764,666 | A | 8/1988 | Bergeron |
| 4,882,473 | A | 11/1989 | Bergeron et al. |
| 4,922,522 | A | 5/1990 | Scanlon |
| 5,158,293 | A | 10/1992 | Mullins |
| 5,324,035 | A | 6/1994 | Morris et al. |
| 5,373,440 | A | 12/1994 | Cohen |
| 5,377,975 | A | 1/1995 | Clapper, Jr. |
| 5,398,932 | A | 3/1995 | Eberhardt et al. |
| 5,569,082 | A | 10/1996 | Kaye |
| 5,586,937 | A | 12/1996 | Menashe |
| 5,628,684 | A | 5/1997 | Bouedec |
| 5,645,485 | A | 7/1997 | Clapper, Jr. |
| 5,653,635 | A | 8/1997 | Breeding |
| 5,709,603 | A | 1/1998 | Kaye |
| 5,722,891 | A | 3/1998 | Inoue |
| 5,749,784 | A | 5/1998 | Clapper, Jr. |
| 5,768,382 | A | 6/1998 | Schneier et al. |
| 5,772,511 | A | 6/1998 | Smeltzer |
| 5,788,573 | A | 8/1998 | Baerlocher et al. |
| 5,791,990 | A | 8/1998 | Schroeder et al. |
| 5,810,664 | A | 9/1998 | Clapper, Jr. |

(Continued)

FOREIGN PATENT DOCUMENTS

| | | |
|---|---|---|
| WO | WO 91/06931 | 5/1991 |

*Primary Examiner*—Benjamin Layno
(74) *Attorney, Agent, or Firm*—Lowrie, Lando & Anastasi, LLP

(57) ABSTRACT

A method and apparatus for playing a variation of keno in which the game player pays to play through any number of methods, reveals whether the player has a winning number of matches by playing a solitaire game, and then receives the appropriate winnings if any. The solitaire game may be played, for example, over the Internet or other network using a computer system. The computer system may be, for instance, a cell phone, a personal computer, a set-top box, kiosk, or other computing system.

44 Claims, 9 Drawing Sheets

U.S. PATENT DOCUMENTS 5,823,873 A 10/1998 Moody
5,823,874 A 10/1998 Adams
5,830,069 A * 11/1998 Soltesz et al. ................ 463/42
5,848,932 A 12/1998 Adams
5,860,653 A 1/1999 Jacobs
5,871,398 A 2/1999 Schneier et al.
5,882,258 A 3/1999 Kelly et al.
5,887,906 A 3/1999 Sultan
5,928,082 A 7/1999 Clapper, Jr.
6,007,426 A 12/1999 Kelly et al.
6,012,983 A 1/2000 Walker et al.
6,028,920 A 2/2000 Carson
6,044,135 A 3/2000 Katz
6,048,269 A * 4/2000 Burns et al. .................. 463/25
6,059,289 A 5/2000 Vancura
6,077,163 A 6/2000 Walker et al.
6,106,393 A 8/2000 Sunaga et al.
6,146,272 A 11/2000 Walker et al.
6,152,823 A 11/2000 Lacoste et al.
6,159,097 A 12/2000 Gura
6,162,121 A 12/2000 Morro et al.
6,179,711 B1 1/2001 Yoseloff
6,186,892 B1 2/2001 Frank et al.
6,203,427 B1 3/2001 Walker et al.
6,236,900 B1 5/2001 Geiger
6,251,017 B1 6/2001 Leason et al.
6,283,855 B1 9/2001 Bingham
6,311,976 B1 11/2001 Yoseloff et al.
6,312,334 B1 11/2001 Yoseloff
6,358,151 B1 3/2002 Enzminger et al.
6,364,765 B1 4/2002 Walker et al.
6,368,214 B1 4/2002 Luciano
6,368,218 B2 4/2002 Angell, Jr.
6,375,567 B1 4/2002 Acres
6,394,902 B1 5/2002 Glavich et al.
6,402,614 B1 6/2002 Schneier et al.
6,471,208 B2 10/2002 Yoseloff et al.
6,488,280 B1 12/2002 Katz et al.
6,514,144 B2 2/2003 Riendeau et al.
6,523,829 B1 2/2003 Walker et al.
6,527,175 B1 3/2003 Dietz et al.
6,540,230 B1 4/2003 Walker et al.
6,565,084 B1 5/2003 Katz et al.
6,572,107 B1 6/2003 Walker et al.
6,575,832 B1 6/2003 Manfredi et al.
6,582,307 B2 6/2003 Webb
6,588,747 B1 7/2003 Seelig
6,607,439 B2 8/2003 Schneier et al.
6,612,501 B1 9/2003 Woll et al.
6,612,574 B1 9/2003 Cole et al.
6,619,660 B2 9/2003 Schaefer et al.
6,625,578 B2 9/2003 Spaur et al.
6,645,074 B2 11/2003 Thomas et al.
6,656,042 B2 12/2003 Reiss et al.
6,663,105 B1 12/2003 Sullivan et al.
6,676,126 B1 1/2004 Walker et al.
6,679,497 B2 1/2004 Walker et al.
6,681,995 B2 1/2004 Sukeda et al.
6,682,419 B2 1/2004 Webb et al.
D486,869 S 2/2004 Webb et al.
6,685,561 B2 2/2004 Anderson et al.
6,692,353 B2 2/2004 Walker et al.
6,705,944 B2 3/2004 Luciano
6,716,103 B1 4/2004 Eck et al.
6,719,631 B1 4/2004 Tulley et al.
6,729,956 B2 5/2004 Wolf et al.
6,733,385 B1 5/2004 Enzminger et al.
6,749,198 B2 6/2004 Katz et al.
6,811,484 B2 11/2004 Katz et al.
6,824,467 B2 11/2004 Schlottmann et al.
6,843,724 B2 1/2005 Walker et al.
6,855,052 B2 2/2005 Weiss et al.
6,899,622 B2 5/2005 Lind et al.
6,918,589 B2 7/2005 Thibault
6,942,570 B2 9/2005 Schneier et al.
7,008,317 B2 3/2006 Cote et al.
2002/0013167 A1 1/2002 Spaur et al.
2002/0052229 A1 5/2002 Halliburton et al.
2002/0061778 A1 5/2002 Acres
2002/0077173 A1 6/2002 Luciano et al.
2002/0090986 A1 7/2002 Cote et al.
2002/0090987 A1 7/2002 Walker et al.
2002/0098882 A1 7/2002 Lind et al.
2002/0147040 A1 10/2002 Walker et al.
2002/0155885 A1 10/2002 Shvili
2002/0169018 A1 11/2002 Schneier et al.
2002/0187827 A1 12/2002 Blankstein
2002/0193158 A1 12/2002 Weiss et al.
2002/0198038 A1 12/2002 Adams
2003/0027628 A1 2/2003 Luciano
2003/0045340 A1 3/2003 Roberts
2003/0060257 A1 3/2003 Katz et al.
2003/0060261 A1 3/2003 Katz et al.
2003/0069068 A1 4/2003 Kaminkow
2003/0080508 A1 5/2003 Thibault
2003/0102625 A1 6/2003 Katz et al.
2003/0114217 A1 6/2003 Walker et al.
2003/0119581 A1 6/2003 Cannon et al.
2003/0139214 A1 7/2003 Wolf et al.
2003/0155715 A1 8/2003 Walker et al.
2003/0176212 A1 9/2003 Schlottmann et al.
2003/0186739 A1 10/2003 Paulsen et al.
2003/0195841 A1 10/2003 Ginsberg et al.
2003/0218303 A1 11/2003 Walker et al.
2004/0036212 A1 2/2004 Walker et al.
2004/0038723 A1 2/2004 Schneier et al.
2004/0051240 A1 3/2004 Adams
2004/0053683 A1 3/2004 Hartl et al.
2004/0063484 A1 4/2004 Dreaper et al.
2004/0102238 A1 5/2004 Taylor
2004/0127279 A1 7/2004 Gatto et al.
2004/0133472 A1 7/2004 Leason et al.
2004/0142741 A1 7/2004 Walker et al.
2004/0147308 A1 7/2004 Walker et al.
2005/0049042 A1 3/2005 Walker et al.
2005/0075158 A1 4/2005 Walker et al.

* cited by examiner

SYSTEM AND METHOD FOR PLAYING A ROLE-PLAYING GAME

FIELD OF THE INVENTION

The present invention relates generally to games that can be played on a computer, and more particularly, to role-playing games.

BACKGROUND

Solitaire is a class of card games designed to be played by one individual. Rules for numerous games of solitaire can be found in *Hoyle's Official Rules of Card Games*. Various games of solitaire have also been programmed for the computers and the Internet.

One of the more widely known games of solitaire is Microsoft's FreeCell, a computer version of Klondike solitaire. The basic rules of FreeCell are as follows:

- From a 52-card deck, cards are dealt to seven spots of a tableau, from left to right, with the top card on each spot face up.
  - Spot 1: one card
  - Spot 2: two cards
  - Spot 3: three cards
  - Spot 4: four cards
  - Spot 5: five cards
  - Spot 6: six cards
  - Spot 7: seven cards
- The remainder of the deck is used to form a pile of cards that form a stock pile from which are turned during play.
- Cards can be moved around on the tableau, or from the stock pile to the tableau, only if the card is one lower in rank and an alternating color than a card upon which it is being placed.
  - When a card or group of cards is moved off one of the spots, revealing a face down card, that face down card can be turned over.
  - When one of the seven spots is empty, only a king can be placed in that empty spot.
  - Three cards are turned from the stock pile at a time, and only a top card of the three turned cards is available for play. It is possible to rotate through the stock cards multiple times.
- When an ace is revealed, the ace can be placed above the tableau to begin a foundation stack. A foundation stack is created for each suit.
  - Foundation stacks can only be built in a same suit of increasing rank, starting with Ace and finishing with King.
  - A person wins FreeCell by placing all cards into the foundation stacks.

Keno is a legalized public and private game common in the United States and throughout the world. In Keno-type games, winning numbers are randomly drawn from a large population of numbers, e.g., integers from 1 to 80. Indeed, keno-type games typically select more winning numbers from the population of numbers than are required to win.

Game participants typically can choose how many winning numbers they want to try to match in each game. For example, a participant can select two, five, ten, or other number of winning numbers. Typically, about twenty winning numbers are selected from the population of numbers and game participants may win a prize if they match anywhere between zero and fifteen of the winning numbers. Thus, a game participant still can win a top prize without having to match all, or even any, of the winning numbers drawn. Prizes (e.g., cash jackpots) are greater when more numbers must be, and ultimately are, matched. Indeed, keno prizes generally increase commensurate with the odds of matching two numbers of the twenty selected, versus matching five of twenty, versus matching ten of twenty, etc. Indeed, by comparison to most gambling games, keno-type games typically produce more opportunities to match winning numbers.

SUMMARY

According to one aspect of the present invention a keno game having an associated game session is provided, comprising a selection of a plurality of numbers associated with a player, a selection of a plurality of winning numbers associated with the keno game, and a solitaire game, wherein play of the solitaire game by the player reveals one or more matches between the plurality of numbers associated with the player and the plurality of winning numbers.

According to one embodiment of the invention, the player pays to play with at least one of money and loyalty points. According to another embodiment of the invention, the player pays by at least one of cash, debit card, credit card, account credit and loyalty program credit. According to another embodiment of the invention, the player may subscribe to play multiple game sessions. According to another embodiment of the invention, the player may automatically renew the subscription. According to another embodiment of the invention, the player pays to play at a casino. According to another embodiment of the invention, the player is issued a ticket upon paying. According to another embodiment of the invention, the player enters ticket information into the gaming computer to play the game. According to another embodiment of the invention, the player plays against the game operator. According to another embodiment of the invention, the player does not need to play the solitaire game to play the keno game. According to another embodiment of the invention, the player does not need to play the solitaire game to win. According to another embodiment of the invention, the player may play the solitaire game to reveal the one or more matches.

According to one embodiment of the invention, each of a plurality of specified cards in the solitaire game represent the respective ones of the plurality of numbers associated with the player. According to another embodiment of the invention, at least one of the specified cards that is revealed during play of the solitaire game also reveals whether a number represented by the at least one of the specified cards matches one of the plurality of winning numbers. According to another embodiment of the invention, all of the specified cards are revealed at least by a completion of the solitaire game. According to another embodiment of the invention, it is revealed how many of the plurality of numbers associated with the player match the plurality of winning numbers.

According to one embodiment of the invention, the player may play by at least one of an interactive television, a personal computer, a kiosk, a handheld device, and a telephone having a display. According to another embodiment of the invention, the player may play off-site from a casino.

According to another embodiment of the invention, a payout for winning the keno game depends upon the number of matching numbers between the player's numbers and the winning numbers. According to another embodiment of the invention, the payout for winning increases as the number of matching numbers increases. According to another embodiment of the invention, the payout for winning to a player increases with increased payment by the player to play. According to another embodiment of the invention, the game further comprises one or more progressive jackpots. According to another embodiment of the invention, the game further comprises a payout table, wherein the payout table is not directly determined by the odds of winning with or without a fee to the gaming operator.

According to one embodiment of the invention, a payout for winning the keno game includes at least one of money, credit, merchandise and loyalty points. According to another embodiment of the invention, the payout for winning money is by cash, check, debit card, or account credit. According to another embodiment of the invention, the payout for winning loyalty points is loyalty program credit or account credit. According to another embodiment of the invention, the player may receive the winning only at a casino. According to another embodiment of the invention, the game sessions run continually. According to another embodiment of the invention, a game playing computer system randomly picks the plurality of numbers associated with the player from a predetermined set of numbers. According to another embodiment of the invention, a game playing computer system randomly picks the plurality of winning numbers from a predetermined set of numbers.

According to one embodiment of the invention, a game is provided wherein after the plurality of winning numbers and the plurality of numbers associated with the player are drawn, the computer system performs acts of determining how many numbers match between the numbers associated with the player and the plurality of winning numbers, and determining a payout based upon a predetermined payout table. According to another embodiment of the invention, the payout is determined independently of play of the game of solitaire by the player. According to another embodiment of the invention, the payout table is based solely on number of matches between the plurality of winning numbers and the plurality of numbers associated with the player. According to another embodiment of the invention, a game playing computer system displays to a plurality of players when there is a winner. According to another embodiment of the invention, a game playing computer system displays to a plurality of players, a winning player among the plurality of players. According to another embodiment of the invention, the computer system automatically notifies the player of the game result. According to another embodiment of the invention, the computer system automatically notifies the player of winnings. According to another embodiment of the invention, the computer system notifies a player by at least one of a group including a telephone, a pager, a fax, a mail message, a television notification, a personal computer message, a handheld device, and a kiosk.

According to one embodiment of the invention, the game sessions run continually with advertising streams inserted into the display during the game session. According to another embodiment of the invention, the game sessions run continually with advertising streams displayed between individual game sessions. According to another embodiment of the invention, the player may enter a game session through an alternative method of entry (AMOE). According to another embodiment of the invention, the player pays to play through a lottery agent. According to another embodiment of the invention, the player is issued a ticket upon paying. According to another embodiment of the invention, the player enters ticket information into the gaming computer to play the game. According to another embodiment of the invention, the player pays to play through the Internet.

According to another aspect of the invention, a method is provided for playing a keno game having an associated game session. The method comprises acts of selecting a plurality of numbers associated with a player, selecting a plurality of winning numbers associated with the keno game, and conducting a solitaire game, wherein play of the solitaire game by the player reveals one or more matches between the plurality of numbers associated with the player and the plurality of winning numbers.

According to another embodiment of the invention, the further comprises an act of paying, by the player, to play the keno game, the player paying with money or loyalty points. According to another embodiment of the invention, the method further comprises an act of paying, by the player, to play the keno game, the player paying by cash, debit or credit card, account credit or loyalty program credit. According to another embodiment of the invention, the method further comprises an act of subscribing, by the player, to play multiple game sessions. According to another embodiment of the invention, the method further comprises an act of automatically renewing the subscription. According to another embodiment of the invention, the method further comprises an act of paying, by the player, to play the keno game, wherein the player pays to play the keno game at a casino.

According to one embodiment of the invention, the method further comprises an act of issuing a ticket to the player upon receiving payment for playing the game. According to another embodiment of the invention, the keno game is conducted by a gaming computer, and the method further comprises an act of permitting the player to enter ticket information into the gaming computer to play the keno game. According to another embodiment of the invention, the act of conducting the solitaire game includes permitting the player to play against the game operator. According to another embodiment of the invention, the player is permitted to play the keno game without playing the solitaire game. According to another embodiment of the invention, the player does not need to play the solitaire game to win the keno game.

According to another embodiment of the invention, the act of conducting the solitaire game comprises an act of revealing, during play of the solitaire game, one or more matches. According to another embodiment of the invention, the method further comprises an act of representing each of a plurality of specified cards in the solitaire game by respective ones of the plurality of numbers associated with the player. According to one embodiment of the invention, at least one of the specified cards revealed during play of the solitaire game also reveals whether a number represented by the at least one of the specified cards matches one of the plurality of winning numbers. According to another embodiment of the invention, all of the specified cards are revealed at least by a completion of play of the solitaire game. According to another embodiment of the invention, the method further comprises an act of revealing how many of the plurality of numbers associated with the player match the plurality of winning numbers.

According to another embodiment of the invention, the player is permitted to play by at least one of a group comprising an interactive television, a personal computer, a kiosk, a handheld device, and a telephone having a display. According to another embodiment of the invention, the method further comprises an act of permitting the player to play at a location that is off-site from a legal gambling jurisdiction. According to another embodiment of the invention, the legal gambling jurisdiction includes a casino.

According to one embodiment of the invention, a payout for winning the keno game depends upon the number of matching numbers between the player's numbers and the winning numbers. According to another embodiment of the invention, the payout for winning increases as the number of matching numbers increases. According to another embodiment of the invention, a payout for winning the keno game is increased with an increase in payment by the player to play. According to another embodiment of the invention, the method further comprises an act of maintaining one or more progressive jackpots. According to another embodiment of the invention, the act of conducting the game includes an act of maintaining a payout table, wherein the payout table is not directly determined by the odds of winning with or without a fee to the gaming operator. According to another embodiment of the invention, a payout for winning the keno game includes at least one of money, credit, merchandise and loyalty points. According to another embodiment of the invention, the method further comprises an act of determining a payout for winning the keno game, wherein the payout for winning the keno game includes at least one of cash, check, debit card, and account credit.

According to one embodiment of the invention, the method further comprises an act of awarding loyalty points to the player, wherein the payout includes at least one of a loyalty program credit and an account credit. According to another embodiment of the invention, the method further comprises an act of awarding winnings to the player, and wherein the player is permitted to receive the winnings only at a legal gambling jurisdiction. According to another embodiment of the invention, the legal gambling jurisdiction includes a casino. According to another embodiment of the invention, the method further comprises an act of conducting a plurality of game sessions of the keno game in a continual manner. According to another embodiment of the invention, the player plays the keno game on a computer system, and wherein the computer system randomly picks the plurality of numbers associated with the player from a predetermined set of numbers. According to another embodiment of the invention, the method further comprises, picking, in a random manner, the plurality of winning numbers from a predetermined set of numbers. According to another embodiment of the invention, after the plurality of winning numbers and the plurality of numbers associated with the player are drawn, performing acts of determining how many numbers match between the numbers associated with the player and the plurality of winning numbers, and determining a payout based upon a predetermined payout table.

According to one embodiment of the invention, the payout is determined independently of play of the game of solitaire by the player. According to another embodiment of the invention, the payout table is based solely on number of matches between the plurality of winning numbers and the plurality of numbers associated with the player. According to another embodiment of the invention, the method further comprises an act of displaying an indication of a winning player to a plurality of players. According to another embodiment of the invention, the method further comprises an act of automatically notifying the player of a game result. According to another embodiment of the invention, the method further comprises an act of automatically notifying the player of winnings.

According to another embodiment of the invention, the method further comprises an act of permitting the player to enter the game session through an alternative method of entry (AMOE). According to another embodiment of the invention, the player is permitted to pay for playing the game through a lottery agent. According to another embodiment of the invention, the method further comprises an act of issuing the player a ticket upon paying. According to another embodiment of the invention, the player is permitted to enter information relating to the issued ticket into a gaming computer upon which the player plays the game of solitaire. According to another embodiment of the invention, the player plays the game over a communication network. According to another embodiment of the invention, the communication network includes the Internet.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
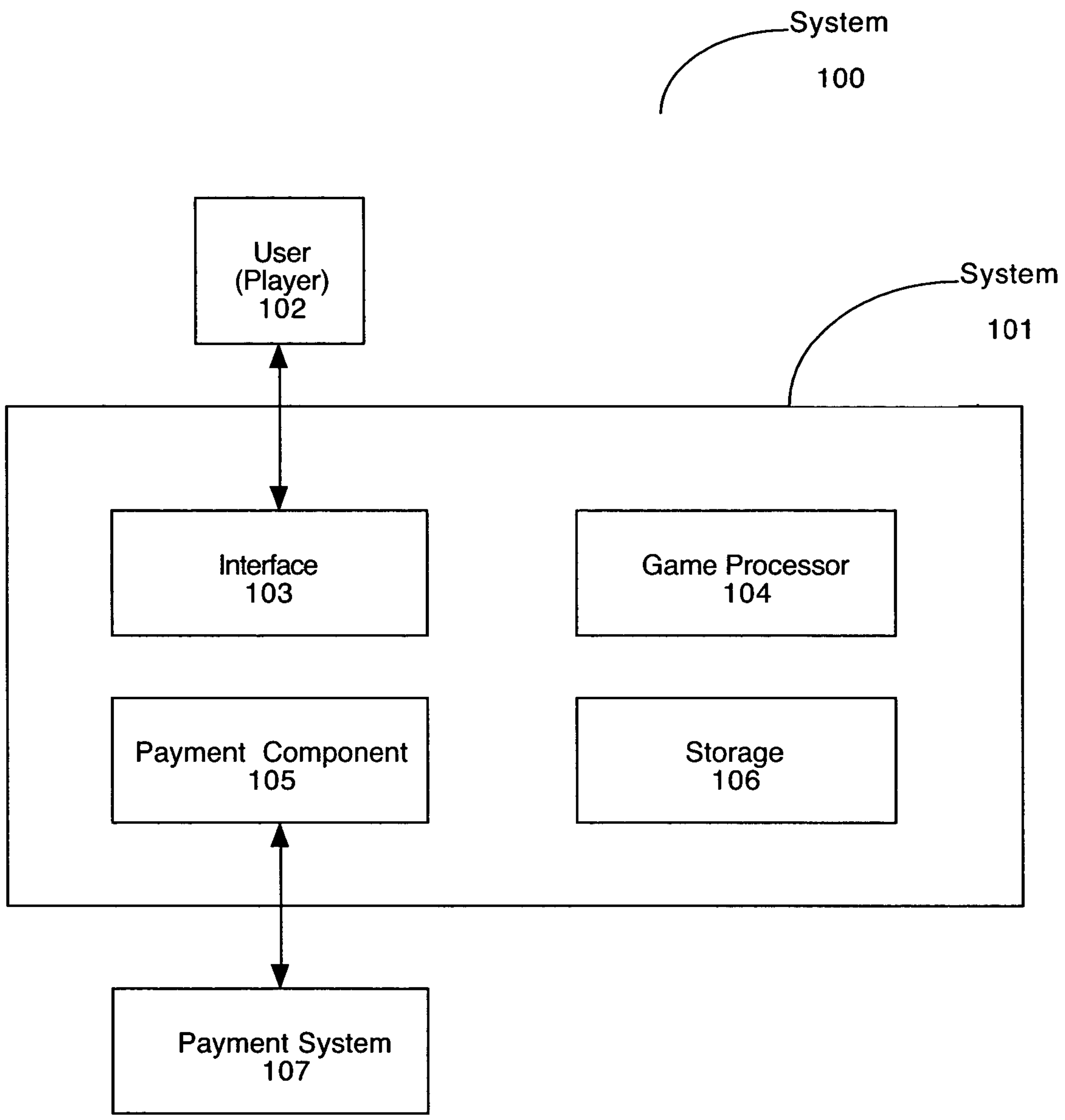
FIG. 1 shows a system for playing a role-playing game according to one embodiment of the present invention.

One aspect of the invention is a variation of keno in which the game player pays to play through any number of methods, reveals whether the player has a winning number of matches by playing a web-based version of solitaire, and then receives the appropriate winnings if any.

Prior to a game session, a game player may need to pay for playing. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The game player may pay in person (e.g., by using a cashier) or through other remote methods including a telephone, a cell-phone, a handheld device (e.g., a PDA), a kiosk, a computer Internet coupled through the Internet or other network, a set top box, mail, or other method. Payment may be in any form that is legal in the particular jurisdiction. Most preferably, the game player pays to play at a casino, through a lottery agent, or over the Internet.

In one embodiment of the invention, players may subscribe to play multiple, preferably consecutive, game sessions. That is, a player may pay at one time to play many game sessions. According to one embodiment, such a player may subscribe to multiple games using any payment method described above. These subscribed games may be automatically played (e.g., by a computer system). In another embodiment, a player may also choose to have his or her subscription automatically renewed.

According to one embodiment of the invention, players may also enter to play this or any other wagering game of chance using an alternative method of entry (AMOE). AMOE is a required available method of entry that does not require a purchase to enter a sweepstake; sweepstakes are usually used as a promotional or marketing tool. An individual entering a sweepstakes by AMOE is required by law to have the same odds of winning each of the available prizes.

A common AMOE method includes sending, by an individual interested in entering the sweepstakes, a post card with his or her name, address or other contact information to a sweepstakes offerer. Another AMOE method includes signing on, by the individual, to an Internet website and submitting the required information for free. Numerous other methods may be used for performing AMOE. Most sweepstakes limit the number of times one individual or family may enter a sweepstakes by AMOE.

According to one embodiment of the invention, it is realized that an AMOE (alternative method of entry) may be used to enter a game of skill or chance. More particularly, it is possible to develop, implement and run wagering games of skill or chance, including the inventive games described herein, with an AMOE method of entry. AMOE methods are conventionally used to enter a player in a sweepstakes, which is not considered wagering or gambling. Thus, according to one embodiment of the invention, an individual may enter the wagering game of skill or chance by AMOE using, for example, the post card or the online method outlined above. The wagering game of skill or chance player entering by AMOE may also have the same odds to win the payout associated with the game in which they are entered. The wagering game of skill or chance player entering by AMOE may also be limited to a small number of games within a given period of time; for example a player entering by AMOE may be limited to entering one game in one year or two games in one month. Other numbers of games and given periods may be any number, and the invention is not limited to any particular implementation.

According to one embodiment, the game that the game player entering by AMOE is entered into may be determined by the game player on the AMOE entry form. For example, the post card AMOE may be required to state the date and the time of the game that the game player wants to enter. Alternatively, the game entered may be the next starting game after the AMOE is received and logged. As another alternative, AMOE entries may be assigned to a specific game(s) each hour, day, week or other time interval.

A gaming operator may collect revenue for operating the game by one or more methods. In one example, the gaming operator collects and retains a portion of an entry fee from each player, the portion being an amount over that which is retained by the gaming operator to pay out for prizes. The entry fee may be, for example, a fee paid for a single game, a fee for entry in a series of games (e.g., a subscription), or an entry fee associated with a tournament.

Further, the gaming operator may generate revenue by accepting bets waged by a player or other person (e.g., a person viewing the game) on an outcome of the game. For instance, a player may bet on whether another player will have a winning combination in a game session, a certain number of winning combinations in a certain number of game sessions, or another outcome. The gaming operator may calculate odds of a particular outcome, and determine a payment on that basis; the pay out may also not be directly related to the odds for a particular outcome.

FIG. 1 shows a block diagram of a system for operating a plurality of game sessions in accordance with one embodiment of the present invention. System 100 includes a system, which may be, for example, a general-purpose computer system as described below with reference to FIG. 2, for conducting the inventive keno-type game.

System 101 includes an interface 103 that interacts with a user (e.g., a player) 102 to play the keno-type game game, place wagers, or communicate information relating to a game session. Interface 103 may be, for example, an interface of a computer system (e.g., an interface presented by a browser program operating in a memory of a computer system) or any type of interface. System 100 may also include a game processor 104 that performs functions relating to conducting the game and any other functions related to the game. Game processor 104 may be, for example, one or more computer processes executing in a memory of system 101. Processor 104 may receive and process bets placed by users through interface 103, conduct game sessions and rules of the game, and determine wins and payouts to players.

Information relating to game sessions may be stored in one or more storage entities 106 (e.g., a device such as a disk) associated with system 101. Storage 106 may, for example, store information directly relating to game play (e.g., current card setup, predetermined winning combination, current state of game play) or other information relating to game play or payment. System 101 may include a payment component 105 that receives payment information from a user 102 through interface 103 to pay, for example, subscription fees to play one or more game sessions. Payments may include, for example, wagers placed by players or any additional bets (e.g., tournament entry fees) paid by a player in association with playing a game. Payment component 105 may communicate with one or more payment systems 107 for the purpose of obtaining payment for playing the game.

According to one embodiment, a game has predetermined prize levels associated with it. The prize levels may also have adjustments for a player's subscription. For instance, the prize levels may increase if the player has a multiple game subscription of high payment per game. The prize levels may also be adjusted for numerous other criterion including frequent player credits. Of course, all prize level adjustments must meet any legal requirements for the gaming jurisdiction in which the game is played.

The prize levels for each game may also be supplemented by a jackpot that transfers from game session to game session. These types of jackpots are commonly referred to as rolling or progressive jackpots. A rolling jackpot may be, for example, the same amount that transfers from game to game until the jackpot is paid out. A progressive jackpot is a rolling jackpot that increases as more games, game cards or other criterion are played.

The final prize level may also be affected by bonus play, which is well known in the gaming industry. Bonus play works to increase some payouts by offering the chance to multiply a payout.

One or more games may proceed concurrently. Parameters of concurrent games may be the same, similar, or different. Additionally, games may run continually, i.e. one after another. When one game ends, another game may begin immediately or in a short period of time. Game sessions may follow a precise time schedule so that players know when game will begin. If game play in a game requires four and a half (4.5) minutes to complete, then the next game may start immediately or in thirty seconds to keep to a schedule of games every five minutes at :00, :05, :10, :15, :20, :25, :30, :35, :40, :45, :50, :55 of each hour. Because game sessions may run continually, it may be possible that a particular game session will have no game player playing in it within the particular game session.

In one embodiment, the computer system may display the game(s) or the identity of the game player(s) closest to a winning combination during the game session. The computer system may also choose to display only one or a subset of all the game sessions or identities of such players to a particular game player playing or observing the game session.

In one embodiment, the computer system may then notify all game players playing the game session that a win has occurred. Additionally, the computer system may display the winning game, the winning player's identity, the payout, or prize.

During the period of time between the games, a game operator may make announcements, rest, or any number of actions. If the game is played using a computer system, advertisements, sponsorships, public service announcements or any visual or auditory content may be inserted into these periods. Advertisements and any other content may also be inserted into the game display during a game session.

In one embodiment of the present invention game sessions and game play are partially or fully automated and monitored using one or more computer systems. A computer system may be a single computer that may be a supercomputer, minicomputer or a mainframe or personal computer. A computer system used to run a game and its associated sessions may include a combination of one or more computer systems (of one or more computer system types) that cooperate to accomplish system-level tasks. The computer system also may include input or output devices, displays, or storage units. It should be appreciated that any computer system or systems may be used, and the invention is not limited to any number, type or configuration of computer systems.

Figure 4:
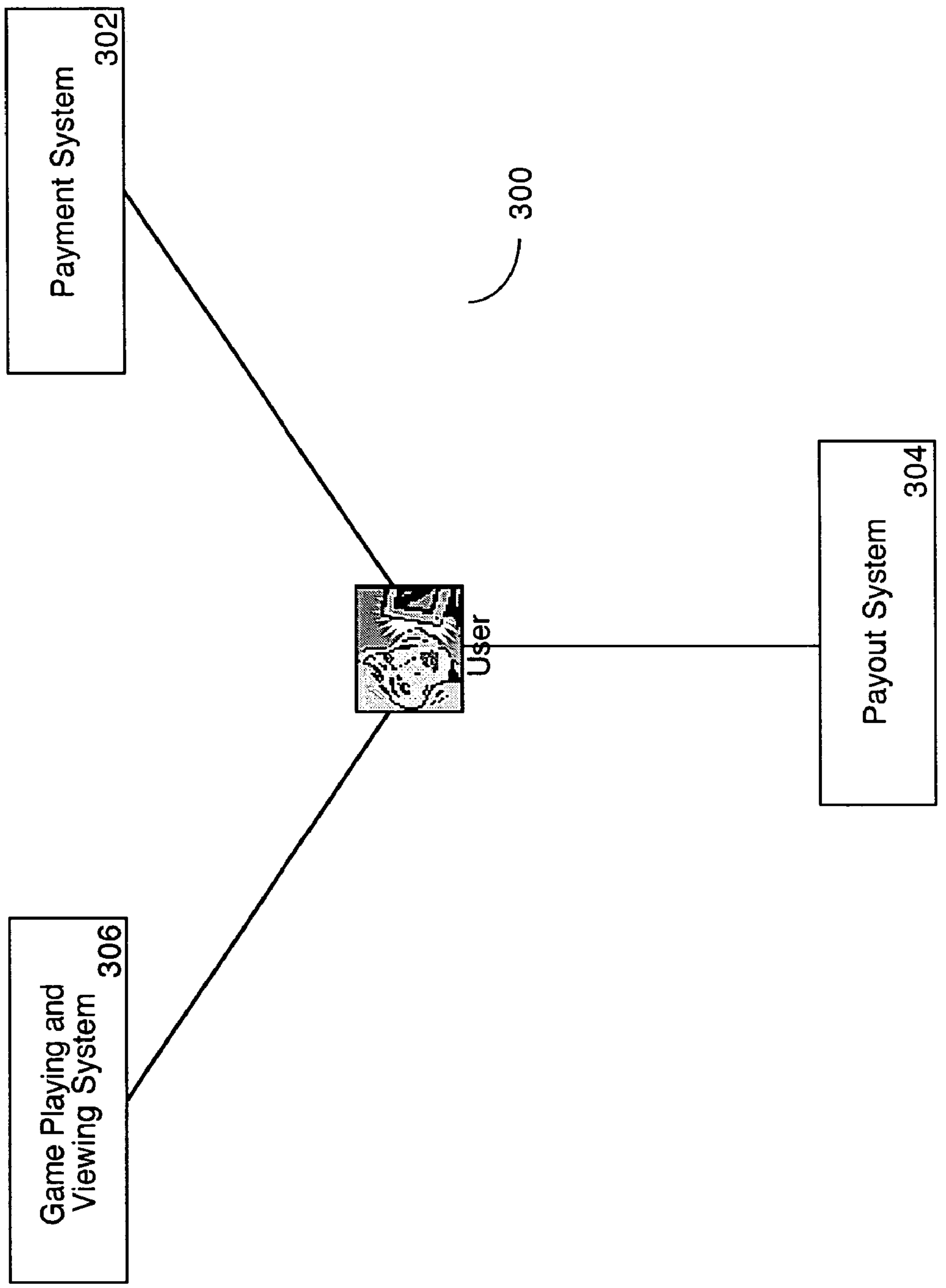
FIG. 4 shows components of a game computer system according to one embodiment of the present invention.

A computer system to run the described game may have three component systems (see FIG. 4). One system may handle payment, subscription and/or AMOE by players to enter the game. Another system may handle playing and viewing the game and the third system may handle payouts. The game system may also be connected by direct line or network to other computer systems including systems for handling casino or hotel loyalty programs, reservations, in-room television viewing or gambling floor kiosks. Connections to other computer systems may be performed using one or more of the system components described below.

Figure 5:
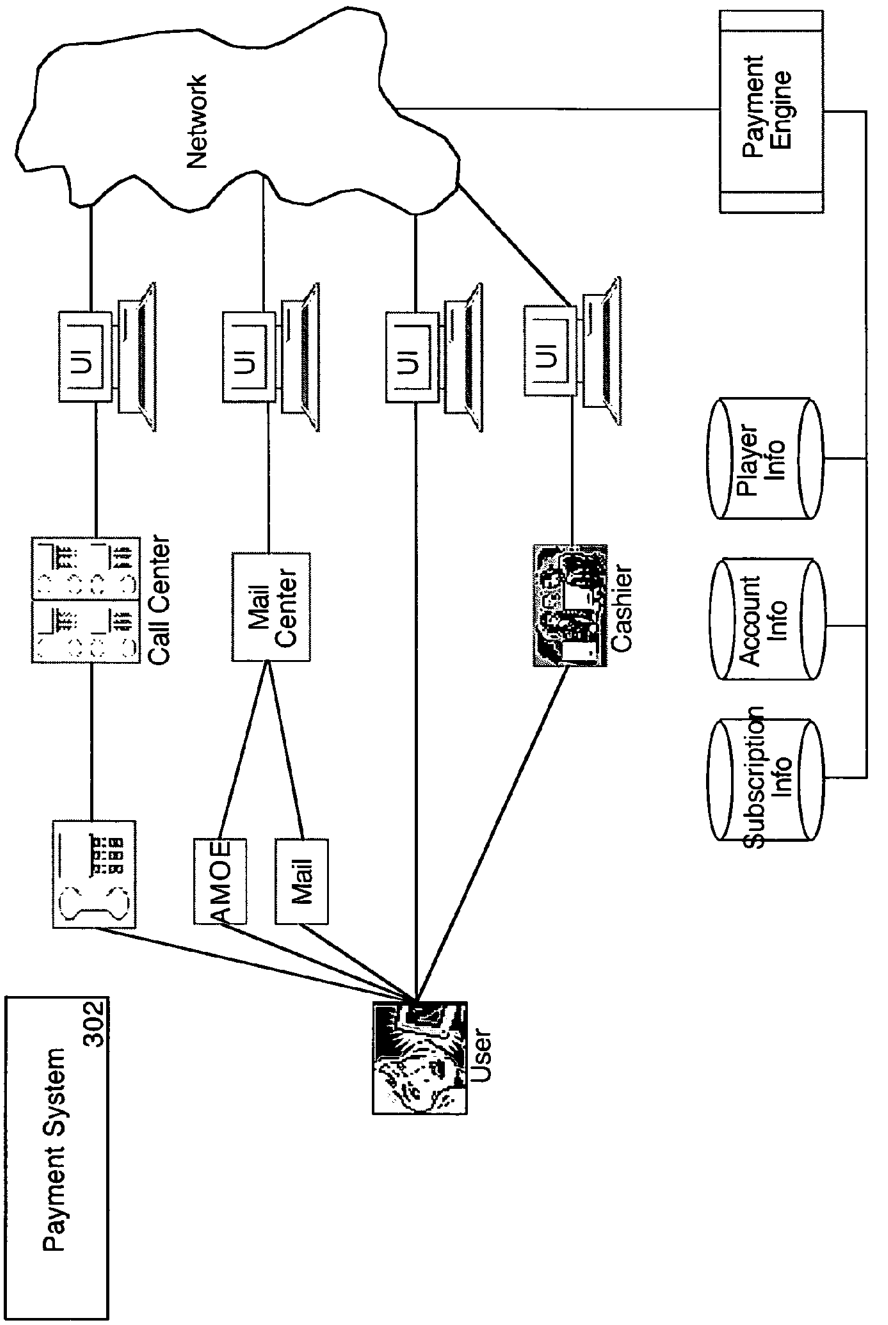
FIG. 5 shows components of a game payment subsystem according to one embodiment of the present invention.

A payment component may be one or many of a number of well-known systems (see FIG. 5). For example, a player may be able to pay to play one or more games using a telephone and speaking with a call center representative or who inputs player, payment, and subscription information into a computer using a user interface. A player may also pay to play using a cashier at a casino that also can enter the above information into a computer. In the computer, data may manually be stored in a data structure that is stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Player information may also be entered into a payment system component. Player information that may be input includes name, address, telephone number, and age. Payment information associated with the player may include credit or debit card number or loyalty account information. Subscription information for games to which the player subscribes may include first game date and time, number of games to play, and bet per game. Based upon the payment and subscription information, the call center representative may then verify that the payment information is valid and enough credit or funds is available for the player's desired subscription.

A similar system may exist for players entering using the mail or a post card AMOE except the call center may be replaced by a mail center with representatives entering information into a computer via a user interface. For example, a cashier that works at a casino directly with players that pay cash or credit to play, may also have the ability to input player, account, and subscription information using a user interface.

Computer systems or pay engines for handling electronic or online payment and subscriptions may also be used. Such systems are well-known, and include such systems as Pay Pal, iKobo, Verisign, and other systems. Using such a system, a player interacts directly with a user interface to input information into a payment data structure that may be transferred to one or more payment systems (e.g., PayPal).

Various pay systems and one or more user interfaces may be located on one or more computer systems coupled by a network with the computer system(s) containing the player, account, and subscription database(s). As used herein, a "network" or a "communications network" is a group of two or more devices interconnected by one or more segments of transmission media on which communications may be exchanged between the devices.

The above are merely an illustrative embodiment of a pay system component. It should be appreciated that such an illustrative embodiment is not intended to limit the scope of the invention, as any of numerous other implementations of a pay system component, for example, variations of online payment, are possible and are intended to fall within the scope of the invention. For example, the payment system component may include using pay-per-view systems associated with interactive television or the pay engine may additionally deliver a receipt to the player by either e-mail or mail. None of the claims set forth below are intended to be limited to any particular implementation of the pay system unless such claim includes a limitation explicitly reciting a particular implementation.

Figure 6:
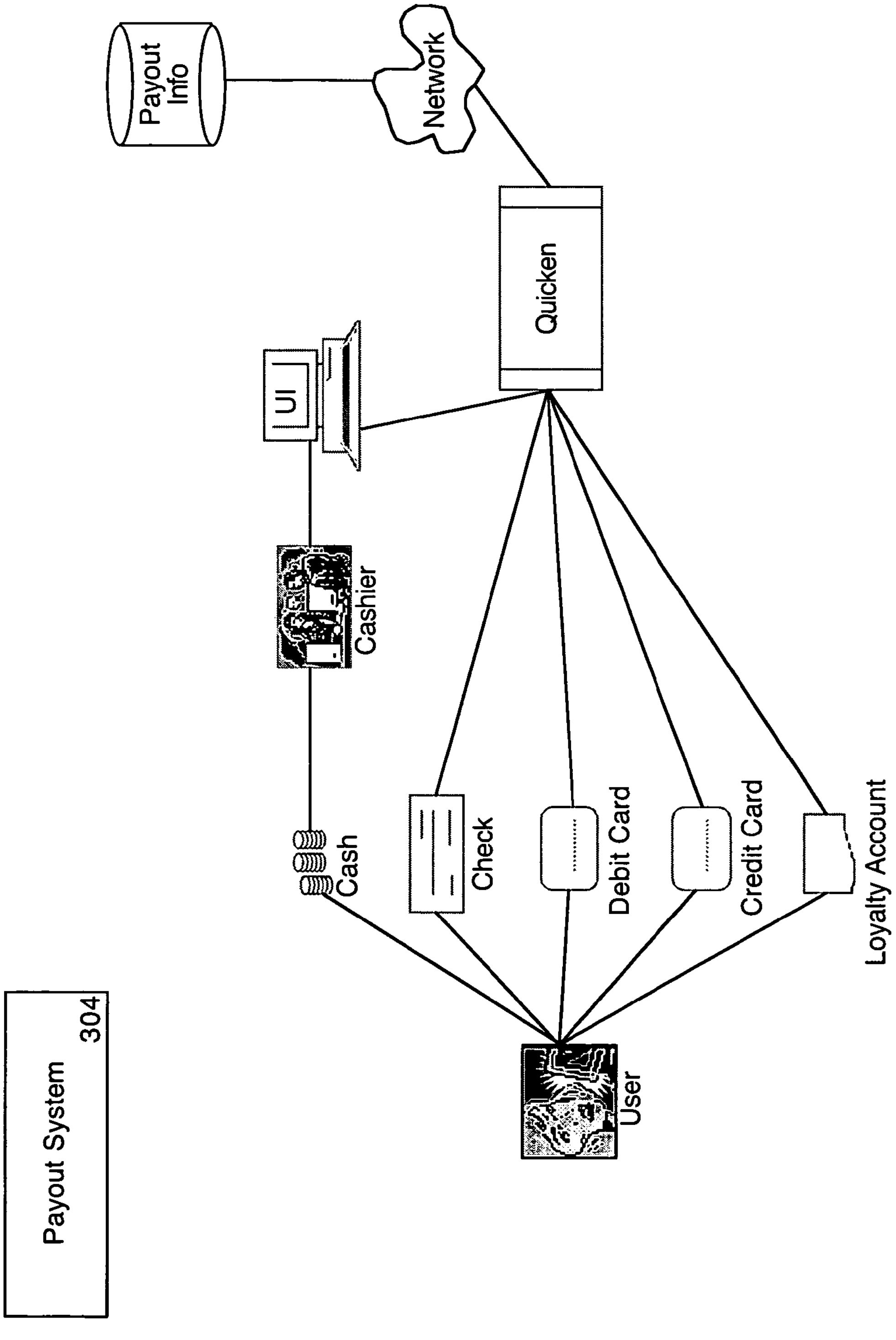
FIG. 6 shows components of a game payout subsystem according to one embodiment of the present invention.

Payout systems are also well-known (see FIG. 6). Any of a number of standard systems or payout engines for making payouts for winning may be used. For example, a standard application programming interface such as 'Quicken' (Intuit Inc., Mountain View, Calif., USA) may be used to write and mail checks or credit a debit card, credit card (if legal in the jurisdiction of play), or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier (e.g. at a casino) may also have access to payout information using a user interface to the payout data structure through a network; the cashier then makes a payment to the winning player based upon the accessed information. None of the claims set forth below are intended to be limited to any particular implementation of the pay system unless such claim includes a limitation explicitly reciting a particular implementation.

Figure 7:
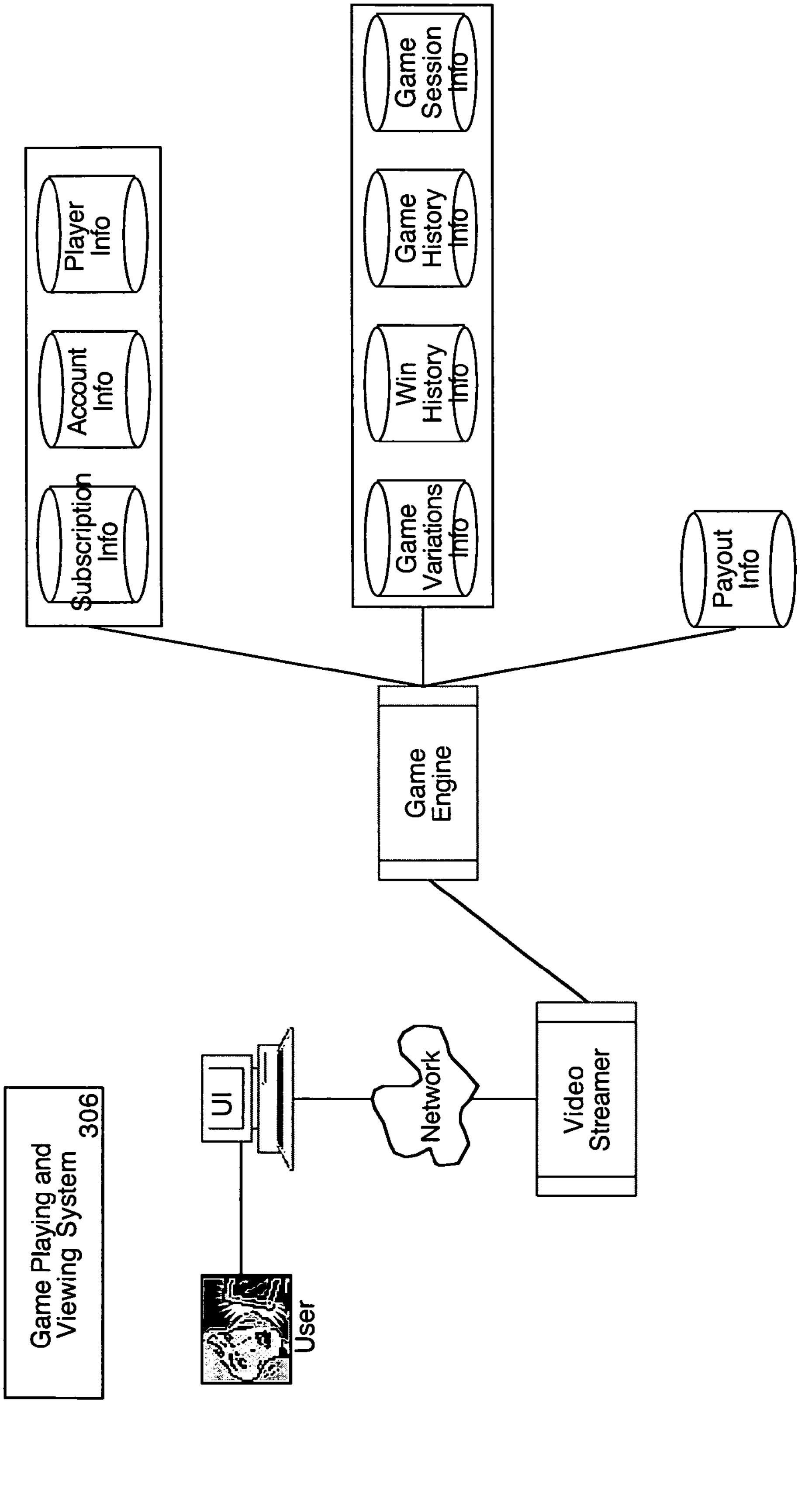
FIG. 7 shows components of a game playing and viewing subsystem according to one embodiment of the present invention.

A game playing and viewing system may comprise of a number of components for performing specific functions (e.g., see FIG. 7). These components may include, for example, storage components that store data structures that include information relating to storing game variations, present game information, game history, and win history. A game playing and viewing system may also include components used to access payment and payout data structures.

Figure 8:
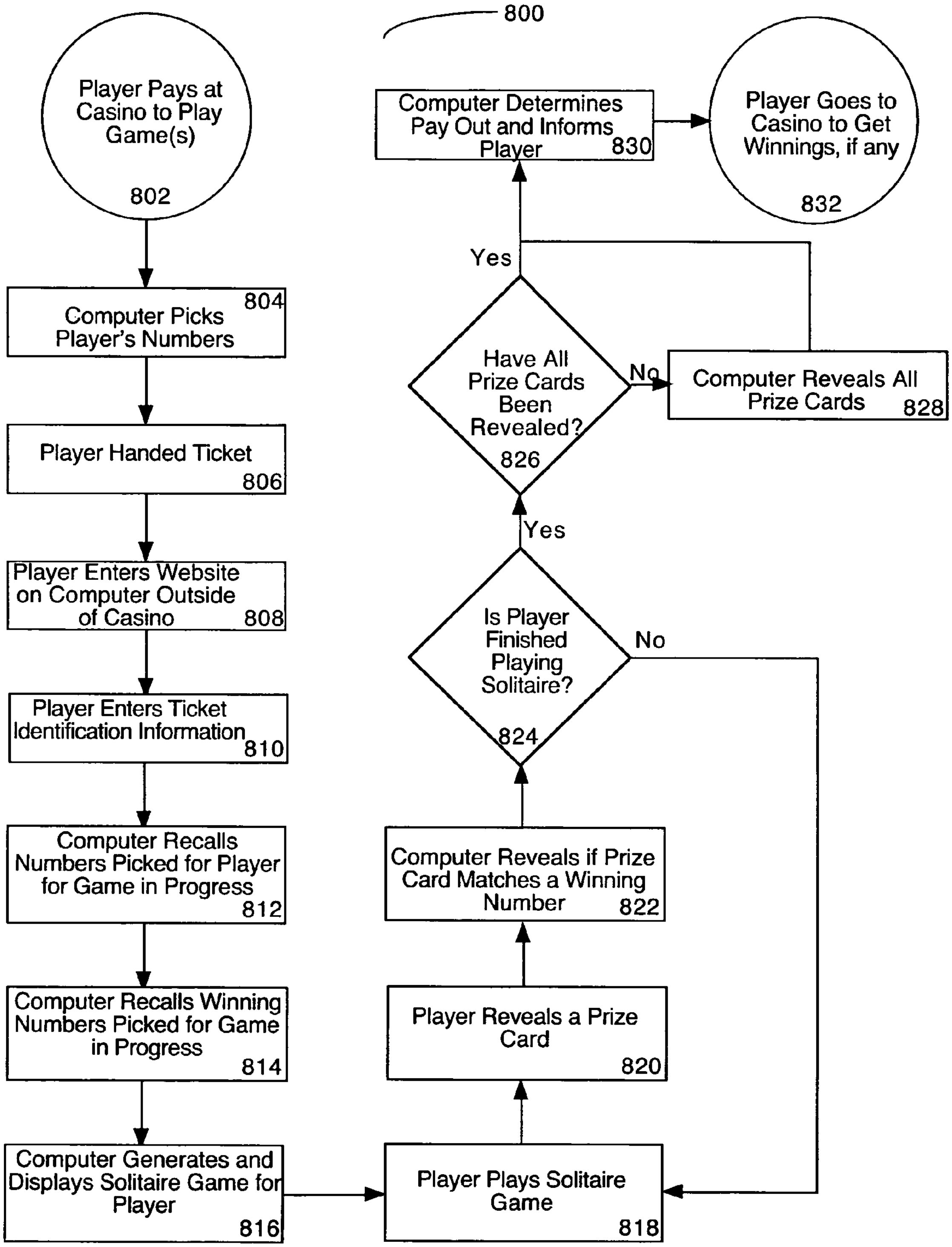
FIG. 8 shows a process for conducting a keno-type game according to one embodiment of the present invention.

A game playing and viewing system according to one embodiment may also include a game engine. A game engine may perform functions relating to conducting a game session of a keno-type game. In one example, a game engine may perform functions associated with a process 800 as shown in FIG. 8. A player may play one or more game sessions in an associated interface of a computer system, with the computer presenting, in the associated interface, a role keno-type game to the player.

As shown in FIG. 8, a process 800 for conducting a keno-type game may be performed. At block 802, process 800 begins. One or more systems that conduct the role playing game may permit a player to subscribe to one or more games at block 802. This may be performed, for example, through a cashier at a casino or through at lottery agent. The cashier may be capable of providing subscription and payment information to the payment system and game engine described above. However, it should be appreciated that a player may subscribe and/or pay using any number of methods, and the invention is not limited to any particular subscription or payment method. The player may be permitted to subscribe to one or more sessions of a keno-type game. These sessions may be played at some point in the future and may or may not be played within a legal gambling jurisdiction. Preferably, a player may subscribe to multiple games during a day. In one embodiment of the invention, the game provided is a keno-type game, and therefore the player may be assigned specific game times when paying to play.

At block 804, the computer randomly chooses the numbers the player will try to match for each keno-type game to which the player is subscribed and assigns the information to the payment ticket given to the player at block 806. The computer maintains this information, for example, in the storage associated with the game engine.

At block 808, the player plays the game at a computer terminal, and, in one embodiment, enters a website associated with the keno-type game. In one example, the computer terminal is located outside of a casino or other legal gambling jurisdiction. To play solitaire, the player enters the ticket information at block 810. When the ticket information has been verified by the computer, the computer recalls the numbers picked for the player for the game in progress at block 812 and also recalls the previously chosen winning numbers for the game in progress at block 814.

The computer or player may choose display to the player any game session that has already been completed, i.e. any game for which the winning numbers have already been chosen. Thus, upon first sign-on, a player may enter, for example, the first game paid for, the last game for which winning numbers have been chosen or any game in between.

Figure 9:
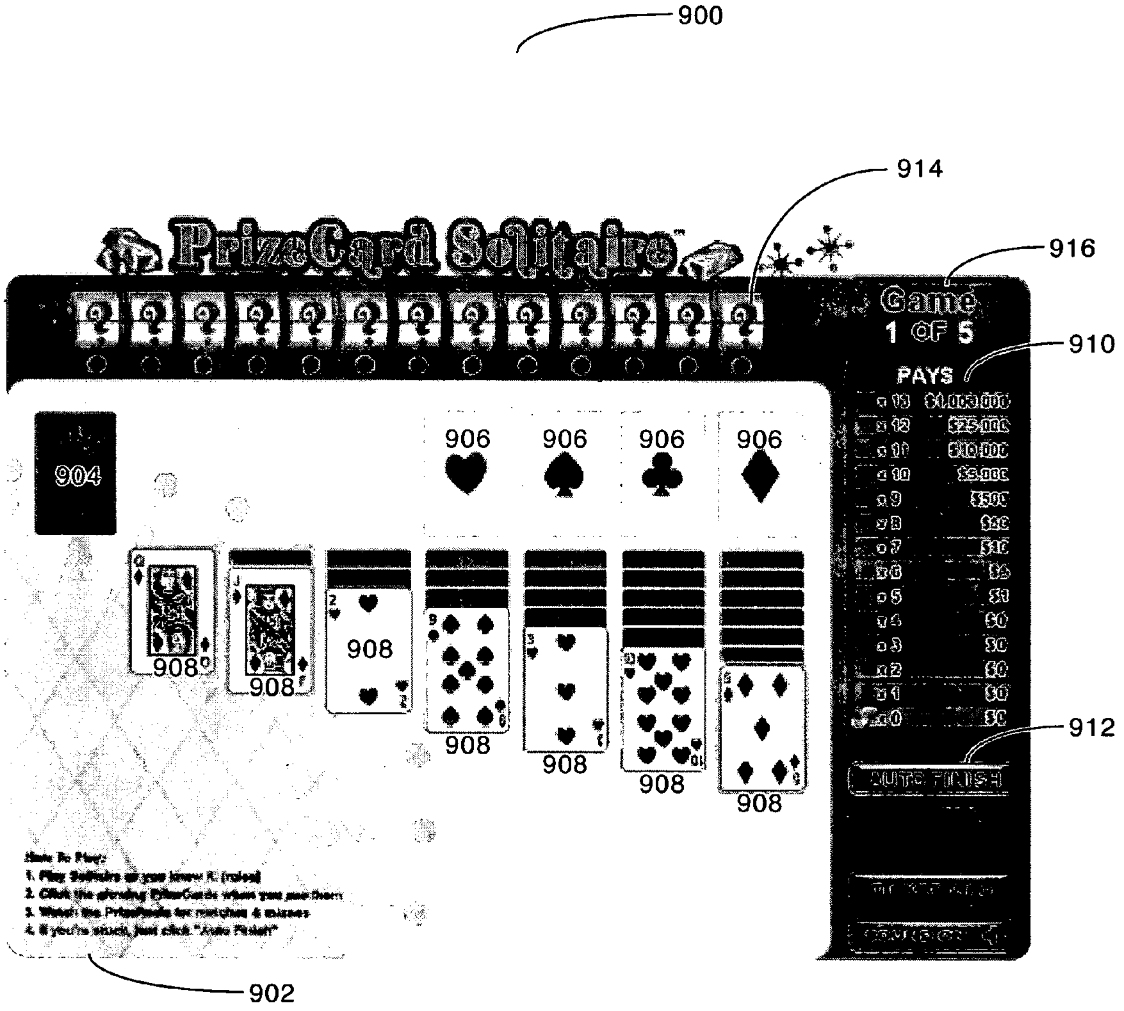
FIG. 9 shows components of the screen for a keno-type game according to one embodiment of the present invention.

At block 816, the computer generates and displays a solitaire game to the player. FIG. 9 depicts an example of what the computer screen 900 may look like according to one embodiment of the invention. Elements include those associated with solitaire including, for example, card stacks 908, foundation blocks 906, and stock pile 904. The example arrangement shown corresponds to that of Klondike solitaire as described above.

A prize card may be identified by suit, flashing symbols, glowing aura, or any other indicator, and may be revealed at block 820. As the prize card is revealed, one of the spinning reels 914 may indicate either a match or no match between the associated player's number and a winning number for the game at block 824. For example, a match may be indicated by a suit symbol (spade, diamond, club, or heart) or any other symbol, and a non-match may be indicated by no symbol or any other symbol.

If the player is not finished playing solitaire at block 824, the player may continue to reveal more prize cards and the computer continues to reveal whether each prize card represents a match or no match to the winning numbers.

When the player is finished playing solitaire, is stuck, or does not want to continue playing solitaire at block 824, the computer reveals the rest of the prize cards and any further matches. The player can inform the computer to reveal all the matches by selecting Autofinish button 912 or by any other method provided by the website. The player may decide not to play solitaire at all and can proceed straight to revealing the matches and receiving the pay out by selecting Autofinish button 912, for example.

If the player is determined to be a winner at block 830, then the computer may proceed to notify the player that he or she is a winner. Further, the computer may determine any payout (e.g., by following a pay out table as depicted by 910) and notify the player of any payout. Winnings for this keno-type game may, according to one embodiment, be completely determined by the number of matches and not by the speed, quality, nor any aspect of play associated with solitaire.

The computer may display the winning game and/or player information to all the game players. Winning player information that may be displayed includes, for example, name, city, state and country. If multiple winners occur simultaneously, all winners or winning games may be displayed at one time or sequentially. It may also be possible that winners or winning games may be selectively displayed to game players. For instance if numerous winners occur at one time, a player in Bismarck, North Dakota may be shown only the winning player information or game that occurred closest to him or her, say in Pierre, South Dakota versus some other location (e.g., Boston, Mass.). If the player has any winnings, the player may then return to the casino to obtain them at block 832.

A player may also decide not to even enter the website. Because the player's number picks are known and the winning numbers for each game session are known, a player may also return to the casino after some or all of the games paid for have been completed to determine and get paid for any winnings. That is, the player may validate his/her games without having played the online portion of the game.

The game play process 800 may exclude one or more acts, or may include one or more additional acts. Further, the order of the acts performed as part of process 800 is not limited to the order illustrated in FIG. 8. Rather, it should be appreciated that the acts as shown in FIG. 8 may be performed in other orders, and one or more of the acts of process 800 may be performed in series or in parallel to one or more other acts, or parts thereof.

Process 800 is merely an illustrative embodiment of a method of game play to be performed, for example, by a game engine. Such illustrative embodiments are not intended to limit the scope of the invention, as any of numerous other implementations may be performed. For example, variations of process 800 are possible and are intended to fall within the scope of the invention. For example, such other implementations may include for playing the keno-like game in a lottery where payment is made through a lottery agent, the solitaire game is played over the the Internet, and payouts are made by the lottery agent. As another example, the keno-like game may be completely transacted through the Internet. None of the claims set forth below are intended to be limited to any particular implementation of the method of game play for a game engine, unless such claim includes a limitation explicitly reciting a particular implementation.

Process 800, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 6, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite, or wireless medium to a user interface. If the game is played completely automatically, the user interface may be merely a video terminal including television with no user input means. Viewing access may be controlled by standard means for conditional access including using set top box addresses, telephone numbers, or internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 300, and components thereof such as the payment, payout and game engines, may be implemented using software (e.g., C, C#, C++, Java, or a combination thereof), hardware (e.g., one or more application-specific integrated circuits), firmware (e.g., electrically-programmed memory), or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 2 and 3.

System 300 is merely an illustrative embodiment of the game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game play, determining winners, and paying winners. It should be appreciated that the system may perform other functions, including network communication, and the invention is not limited to having any particular function or set of functions.

Figure 2:
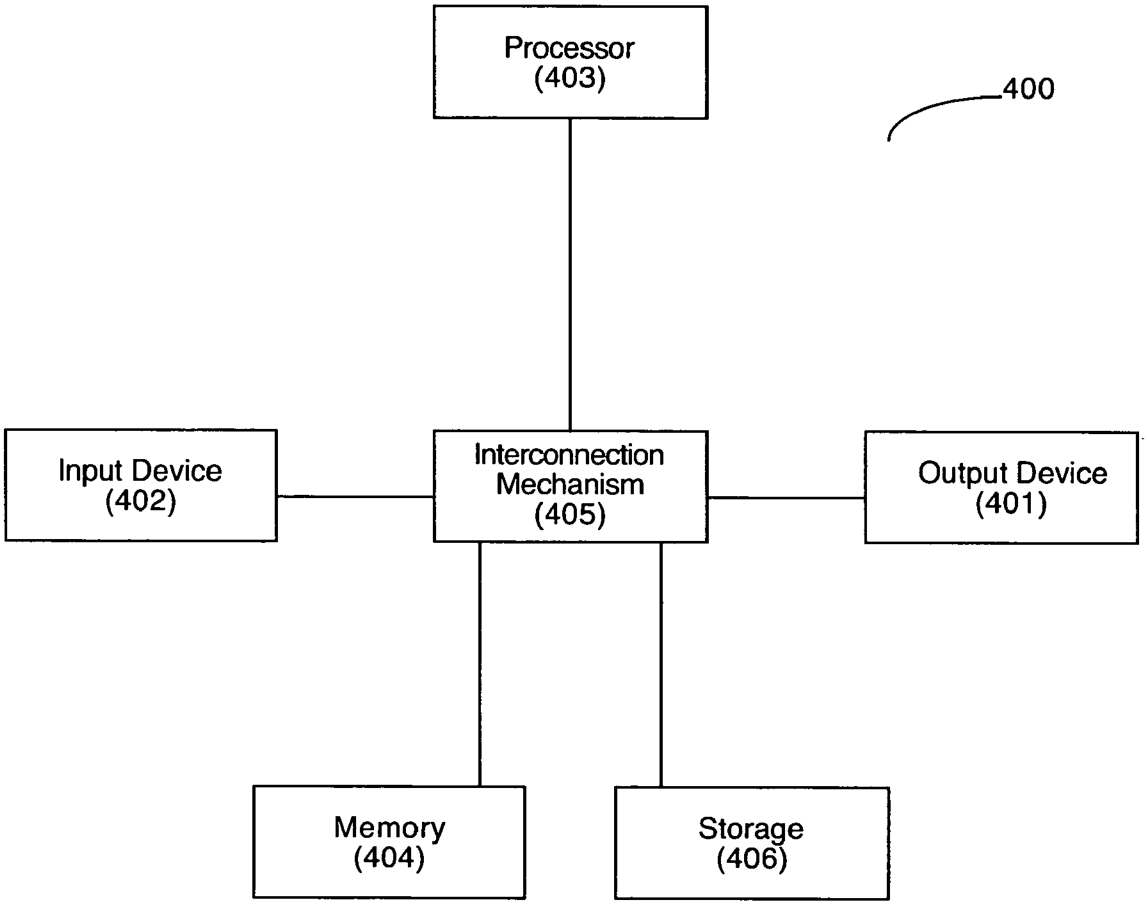
FIG. 2 shows a general-purpose computer system upon which various aspects of the present invention may be implemented.

For example, various aspects of the invention may be implemented as specialized software executing in a general-purpose computer system 400 such as that shown in FIG. 2. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

Figure 3:
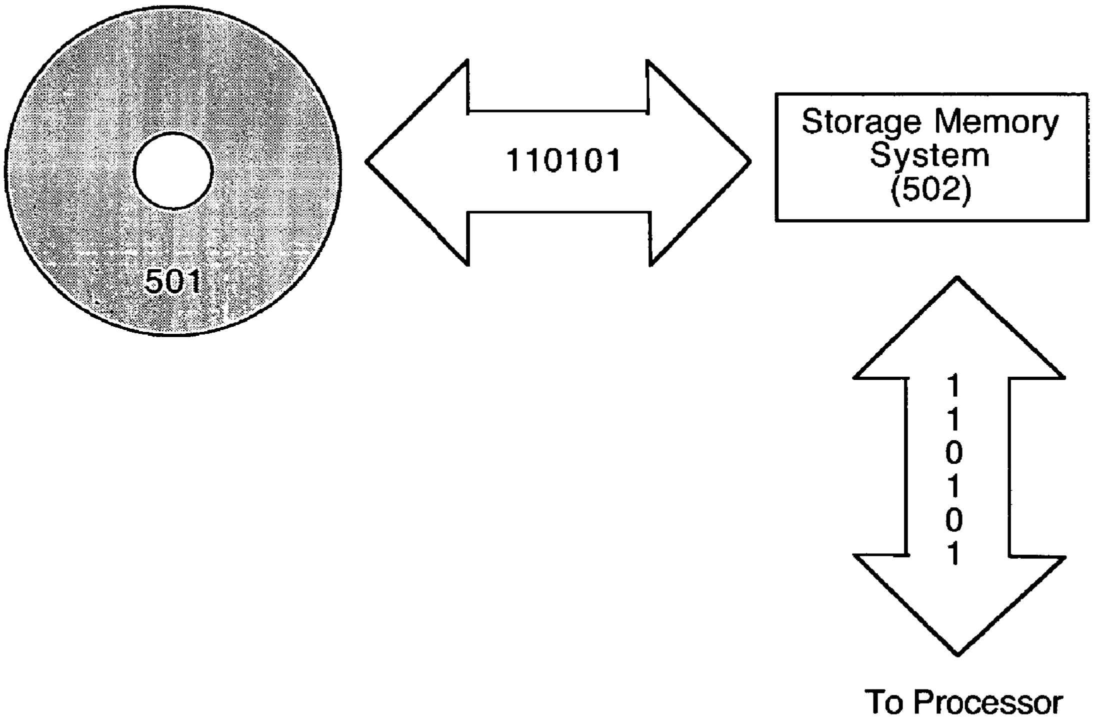
FIG. 3 shows a computer data storage system with which various aspects of the present invention may be implemented.

The storage system 406, shown in greater detail in FIG. 3, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 2. Various aspects of the invention may be practiced on one or more computers having a different architecture or components that that shown in FIG. 2.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems.

Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms “comprising”, “including”, “carrying”, “having”, “containing”, “involving”, and the like are to be understood to be open-ended, i.e., to mean including but not limited to. Only the transitional phrases “consisting of” and “consisting essentially of”, respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for playing a keno game having an associated game session on a game computer, the method comprising acts of:

a) selecting a plurality of numbers associated with a player;

b) automatically selecting a plurality of winning numbers associated with the keno game;

c) determining one or more matches between the plurality of numbers associated with the player and the plurality of winning numbers, the one or more matches indicating keno winnings of the player the one or more matches indicating keno winnings of the player being intially unrevealed to the player; and after steps a) through c), conducting a solitaire game, wherein play of the solitaire game by the player reveals the previously unrevealed one or more matches between the plurality of numbers associated with the player and the plurality of winning numbers.

2. The method according to claim 1, further comprising an act of paying, by the player, to play the keno game, the player paying with money or loyalty points.

3. The method according to claim 1, further comprising an act of paying, by the player, to play the keno game, the player paying by cash, debit or credit card, account credit or loyalty program credit.

4. The method according to claim 1, further comprising an act of subscribing, by the player, to play multiple game sessions.

5. The method according to claim 4, further comprising an act of automatically renewing the subscription.

6. The method according to claim 1, further comprising an act of paying, by the player, to play the keno game, wherein the player pays to play the keno game at a casino.

7. The method according to claim 6, further comprising an act of issuing a ticket to the player upon receiving payment for playing the game.

8. The method according to claim 7, wherein the keno game is conducted by the gaming computer, further comprising an act of permitting the player to enter ticket information into the gaming computer to play the keno game.

9. The method according to claim 1, wherein the act of conducting the solitaire game includes permitting the player to play against the game operator.

10. The method according to claim 1, wherein the player is permitted to play the keno game without playing the solitaire game.

11. The method according to claim 1, wherein the player does not need to play the solitaire game to win the keno game.

12. The method according to claim 1, wherein the act of conducting the solitaire game comprises an act of revealing, during play of the solitaire game, the one or more matches by revealing at least one identifier of a card used in the solitaire game, the at least one card associated with one of the plurality of winning numbers.

13. The method according to claim 12, wherein the player is permitted to play by at least one of a group comprising an interactive television, a personal computer, a kiosk, a hand-held device, and a telephone having a display.

14. The method according to claim 1, further comprising an act of representing a plurality of specified cards in the solitaire game, each of the plurality of specified cards associated with one of the plurality of numbers associated with the player.

15. The method according to claim 14, wherein at least one of the plurality of specified cards revealed during play of the solitaire game also reveals whether a number represented by the at least one of the plurality of specified cards matches one of the plurality of winning numbers.

16. The method according to claim 14, wherein all of the plurality of specified cards are revealed at least by a completion of play of the solitaire game.

17. The method according to claim 16, further comprising an act of revealing how many of the plurality of numbers associated with the player match the plurality of winning numbers.

18. The method according to claim 1, further comprising an act of permitting the player to play at a location that is off-site from a legal gambling jurisdiction.

19. The method according to claim 18, wherein the legal gambling jurisdiction includes a casino.

20. The method according to claim 1, wherein a payout for winning the keno game depends upon the number of matching numbers between the player's numbers and the winning numbers.

21. The method according to claim 20, wherein the payout for winning increases as the number of matching numbers increases.

22. The method according to claim 1, wherein a payout for winning the keno game is increased with an increase in payment by the player to play.

23. The method according to claim 1, further comprising an act of maintaining one or more progressive jackpots.

24. The method according to claim 1, wherein the act of conducting the game includes an act of maintaining a payout table, wherein the payout table is not directly determined by the odds of winning with or without a fee to the gaming operator.

25. The method according to claim 1, wherein a payout for winning the keno game includes at least one of money, credit, merchandise and loyalty points.

26. The method according to claim 1, further comprising an act of determining a payout for winning the keno game, wherein the payout for winning the keno game includes at least one of cash, check, debit card, and account credit.

27. The method according to claim 1, further comprising an act of awarding loyalty points to the player, wherein the payout includes at least one of a loyalty program credit and an account credit.

28. The method according to claim 1, further comprising an act of awarding winnings to the player, and wherein the player is permitted to receive the winnings only at a legal gambling jurisdiction.

29. The method according to claim 28, wherein the legal gambling jurisdiction includes a casino.

30. The method according to claim 1, further comprising an act of conducting a plurality of game sessions of the keno game in a continual manner.

31. The method according to claim 1, wherein the player plays the keno game on a computer system, and wherein the computer system randomly picks the plurality of numbers associated with the player from a predetermined set of numbers.

32. The method according to claim 1, further comprising, picking, in a random manner, the plurality of winning numbers from a predetermined set of numbers.

33. The method according to claim 1, wherein after the plurality of winning numbers and the plurality of numbers associated with the player are drawn, performing acts of:

determining how many numbers match between the numbers associated with the player and the plurality of winning numbers; and determining a payout based upon a predetermined payout table.

34. The method according to claim 33, wherein the payout is determined independently of play of the game of solitaire by the player.

35. The method according to claim 33, wherein the payout table is based solely on number of matches between the plurality of winning numbers and the plurality of numbers associated with the player.

36. The method according to claim 1, further comprising an act of displaying an indication of a winning player to a plurality of players.

37. The method according to claim 1, further comprising an act of automatically notifying the player of a game result.

38. The method according to claim 1, further comprising an act of automatically notifying the player of winnings.

39. The method according to claim 1, further comprising an act of permitting the player to enter the game session through an alternative method of entry (AMOE).

40. The method according to claim 1, wherein the player is permitted to pay for playing the game through a lottery agent.

41. The method according to claim 40, further comprising an act of issuing the player a ticket upon paying.

42. The method according to claim 41, wherein the player is permitted to enter information relating to the issued ticket into the gaming computer upon which the player plays the game of solitaire.

43. The method according to claim 1, wherein the player plays the game over a communication network.

44. The method according to claim 1, wherein the communication network includes the Internet.

* * * * *